June 13, 1950 G. K. McCANDLESS 2,511,073
LIFT TRUCK
Filed May 2, 1946 2 Sheets-Sheet 1
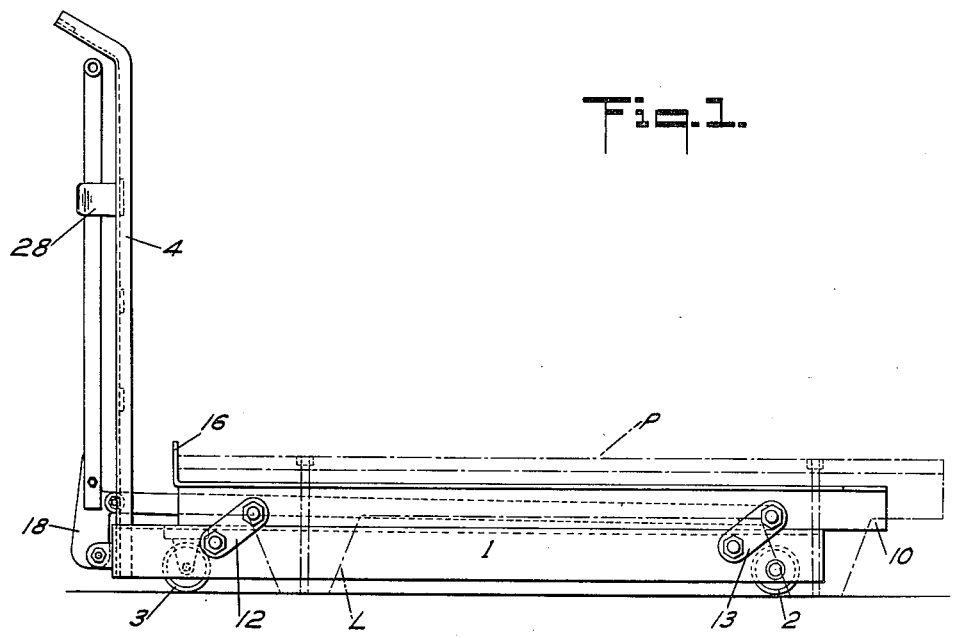
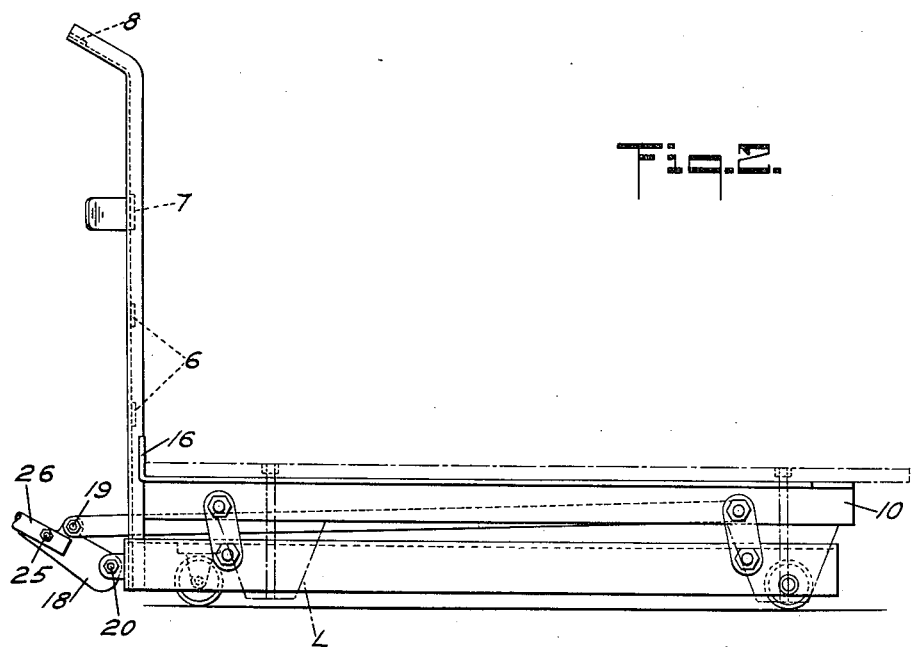
INVENTOR
GEORGE K. McCANDLESS
BY
ATTORNEY June 13, 1950     G. K. McCANDLESS     2,511,073
LIFT TRUCK
Filed May 2, 1946             2 Sheets-Sheet 2
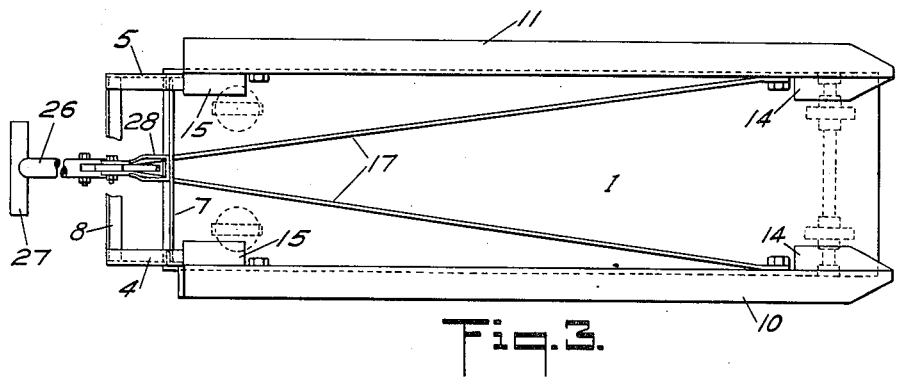
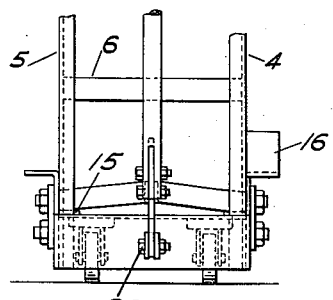
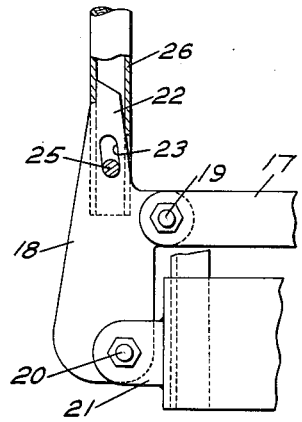
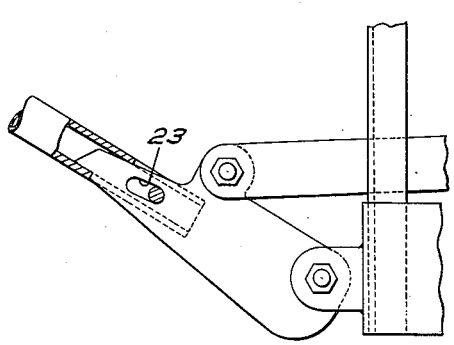
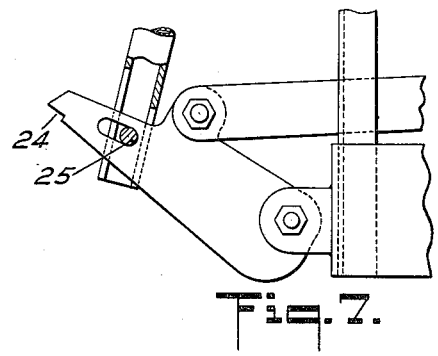
INVENTOR
GEORGE K. McCANDLESS
BY
ATTORNEY Patented June 13, 1950

2,511,073

UNITED STATES PATENT OFFICE 2,511,073

LIFT TRUCK

George K. McCandless, Hellertown, Pa.

Application May 2, 1946, Serial No. 666,632

1 Claim. (Cl. 254—10)

This invention relates to manually operated lift trucks of the type adapted for moving about the floor of a store, warehouse or the like merchandise disposed on a platform or tray and forming therewith a unitary load, which with the aid of the truck may be lifted at one point or station and moved to and deposited at another station with a minimum of effort and substantially without risk of damage to the merchandise.

The usual apparatus employed for generally similar purposes comprises a platform having wheels at the rear, rigid supporting legs in front, and means for detachable reception of a wheeled lift jack or other movable device operable to raise the front end of the platform and support it with its legs clear of the floor while it is being moved about on its wheels. In such devices, however, either the platform is not level while resting on its rear wheels and legs or is not level when supported in front by the jack with its legs raised off the floor, and material piled on the platform so as to be stable in one of such positions thus may not be stable in the other with resultant liability of displacement of the load as a whole and/or breakage of fragile articles comprised therein when the angularity of the platform is changed as the jack is raised or lowered or when the platform is in inclined position when being moved about.

The present invention is therefore directed to the provision of an improved truck especially adapted for use in retail stores, crowded warehouses and the like in which space is limited, which embodies means whereby a loaded platform of appropriate size, having supporting feet or brackets but not necessarily provided with wheels, may be lifted vertically, moved about the floor and re-deposited thereon in close quarters without tilting either the platform or the load, whereby the equilibrium condition of the latter on the platform remains undisturbed whether the platform be resting on or in movement over the floor. The truck is therefore especially useful in retail stores of the "self-service" type in which packaged merchandise, much of it in glass or other fragile containers, must be moved from a storeroom or other distributing point into the display and retail sales area, frequently during business hours and so while the aisles between banks of shelves, counters or the like are in use by patrons examining and making selection of goods exposed thereon for display and sale.

Since the loading and unloading of the articles usually requires considerably more time than their actual movement in establishments of this kind, substantial savings in equipment costs have been effected by the use of a number of platforms having rear wheels and front supporting legs, each capable of being moved with the aid of a wheeled jack interchangeably and selectively connectible therewith, but in accordance with my invention even greater savings are attained as no wheels are required on the platforms, it being sufficient that they be provided with any suitable means for supporting them above the floor at an elevation sufficient to permit the movable wheeled truck of my invention to be inserted under the bed of the platform preparatory to lifting the platform vertically to clear its supports from the floor; the truck and its burden may then be moved about, the latter deposited at another place and the truck withdrawn and used in like manner to move other similar platforms while the first is being unloaded.

It is therefore a principal object of the invention to provide a truck of the character described comprising generally a bed or frame mounted on more or less conventional wheels or rollers, horizontally extending rails supported therefrom and means operable to move the rails vertically as a unit whereby when the truck is inserted under a platform or the like the latter may likewise be lifted vertically by appropriate movement of the rails and without disturbance of its normally horizontal position to thereby transfer and retain the weight of the platform and its load, if any, upon the truck to enable the platform to be transported therewith to another location at which it may be returned to the floor and the truck so freed for withdrawal from beneath it.

Another object is to provide a manually operated lift truck of this character in which the means for operating the platform lifting mechanism comprises a lever and actuating tongue affording adequate mechanical advantage to the operator to permit lifting of heavy loads and in which after a load is lifted and moved to a position of stable equilibrium on the truck, the actuating tongue may be adjusted to occupy a minimum amount of space in an out of the way position.

Other objects, purposes and advantages of the invention will hereafter appear or be understood from the following description of a preferred embodiment of it in which reference will be had to the accompanying drawings, in which:

Fig. 1 is a side elevation of the truck preparatory to lifting from the floor a typical platform outlined in dot and dash lines;

Fig. 2 is a similar view partly broken away showing the position of the parts after the platform has been lifted and brought to a position of equilibrium upon the truck;

Fig. 3 is a top plan view of the truck as shown in Fig. 2 but with the platform omitted;

Fig. 4 is a fragmentary front elevation of the truck as shown in Fig. 3;

Fig. 5 is an enlarged fragmentary detail in side elevation showing the actuating means for the platform lifting mechanism in position corresponding to that of Fig. 1;

Fig. 6 is a similarly enlarged fragmentary side elevation of the same mechanism but in position corresponding to Fig. 2; and Fig. 7 is a like view of the same mechanism but in a third position.

In the several figures like characters are used to designate the same parts.

Referring now more particularly to the drawings the platform P indicated in dot and dash lines in Figs 1 and 2 may be of any convenient type provided with spaced legs or other supports L affording between the opposite side edges of the platform a space of adequate width to permit the truck to be entered beneath it sufficiently to enable it to be lifted as hereinafter described, but as the specific type or character of platform employed forms no part of the present invention further description of it is unnecessary.

The truck itself, however, comprises a generally rectangular bed or frame 1 supported at the rear on rollers or wheels 2 preferably rotating on a fixed horizontal axis and at the front by caster wheels 3 adapted to swivel in a horizontal plane and thereby permit the truck to be readily guided about the floor in any desired direction. At the front end of the truck is an upwardly projecting end frame formed by side rails 4, 5 and horizontal cross-bars 6, 7, 8, which provides an abutment for a load on the truck and may extend angularly forward at its upper extremity to faciliate moving and guiding the truck about the floor. The elements of the truck thus far described are similar to those of trucks now in general use and may be of any desired construction and/or dimensions appropriate to the mechanism combined therewith in accordance with the invention for lifting a platform and supporting it from the truck while the latter is being moved about.

The said mechanism comprises in general a pair of rails 10, 11 extending longitudinally of the truck bed 1 adjacent its lateral edges and of substantially the same length as the bed. These rails are connected to the side members of the bed by pivoted links 12, 13, and abutments 14, 15 projecting inwardly from the lower edges of the rails above the bed afford support for the rails when the latter are lowered to the position indicated in Fig. 1, while a stop 16 is arranged to project upwardly from the front end of one of the rails to limit by engagement with the edge of a platform P the extent to which the truck may be moved under it. When the rails are thus lowered and so resting on abutments 14, 15, the links 12, 13 extend angularly upward and rearward and, while connecting the rails with the truck, do not contribute substantially to their support. However, when the truck is inserted under platform P and the rails are drawn forward, the links move counterclockwise in Fig. 1 to raise them and hence the platform, to which the links then afford the sole vertical support, and the rails are desirably so proportioned with respect to the links as to abut the end frame 4 as they reach a position just forward of that at which the pivotal centers of the inks are in vertical alignment, as at this over-center position of the links the platform is supported by the rails in stable relationship to the truck frame with its legs L clear of the floor.

For drawing the rails forward and thus raising them and a superposed platform P, draw bars 17 are connected to the rails adjacent the points at which links 13 are secured thereto and converge forwardly between the rails to a lever 18 with which they are pivotally connected by a bolt 19. This lever is supported from the truck bed on a pivot 20 carried by a bracket 21 and forming a fulcrum for the lever which extends therefrom beyond bolt 19 and terminates in a tapered finger 22 formed with a slot 23 in its base and a notch 24 in its extremity. Slot 23 receives a pivot bolt 25 supporting a tubular tongue 26 which is slotted to receive finger 22 and so, depending on the position of bolt 25 in slot 23, may either be engaged in notch 24 or disengaged therefrom and swung about the pivot bolt relatively free of the finger. The other extremity of the tongue carries a handle 27 to facilitate its operation, while the end frame is provided with a spring clip 28 on cross bar 7 adapted to receive and hold the tongue folded back against the end frame when it is not being used.

The manipulation of the truck to position it beneath a platform when the rails are lowered, and its movement about the floor whether loaded or unloaded, require no description as these are well within the understanding of users of trucks of this general character. However after the truck has been positioned beneath a platform, with stop 16 against its front end and tongue 26 positioned to embrace finger 22 and engage in notch 24 as indicated in Fig. 5 whereby the tongue is operatively rigid with lever 18, the tongue is swung downward to move lever 18 about its pivot 20 and thereby draw bars 17 forward and raise the rails on their links 12, 13 until they engage the end frame, the lever then assuming the position indicated in Fig. 6 in which the platform supports L are clear of the floor. During this operation the rails and hence the platform are raised vertically without being tilted in any direction and the truck and its burden may now be moved freely about with the aid of tongue 26, or if desired the latter may be manipulated to release finger 22 by sliding pivot 25 forward in slot 23 and then moved about this pivot relatively to lever 18 until its engages in clip 28. The truck may then be moved with the aid of the end frame or by pushing on the load itself to the place at which the platform is to be re-deposited on the floor and the parts then operated in directions opposite to those just described to lower the rails and permit the truck to be withdrawn from beneath the platform.

The tongue can be folded back against the end frame and left secured by clip 28 when the rails are either raised or lowered, for except when actually being used to raise or lower them it is not required for manipulating the truck, and it is evident the latter may therefore be moved about in restricted spaces as readily as a truck of similar dimensions not provided with platform lift mechanism, while the latter is readily brought into play to lift a platform and/or re-deposit it on the floor when required.

It will further be apparent that when the links are in their over-center position and the ends of the rails in abutting engagement with the end frame, the platform and its load are firmly and adequately supported, while because of the leverage afforded by the arrangement of the rail lifting mechanism the platform can be raised and lowered smoothly and with but little effort even though heavily loaded; also as above noted it is always level both during and at the limits of its movement from the position of Fig. 1 to that of Fig. 2 and vice versa.

While I have herein disclosed one embodiment of the invention with considerable particularity it will be understood it may also be embodied in trucks of other specific character and changes in the form, construction and relationship of the several parts as herein shown and described will readily occur to those skilled in the art and may be made if desired without departing from the spirit and scope of the invention as defined in the appended claim.

Having thus described my invention, I claim and desire to protect by Letters Patent of the United States:

A truck of the class described comprising a wheeled horizontally extending frame, rails disposed above the side edges of the frame, front and rear pivoted links connecting the rails with the frame operative to lift the rails vertically when moved in one direction about their connections with the frame, a lever pivoted to the frame adjacent the front end of the latter and movable substantially in the plane of the longitudinal center line thereof, draw bars having their ends pivoted respectively to the lever at opposite sides thereof and to the rails adjacent the points of connection of the rear links therewith, a tapered finger integral with the lever having a notch adjacent its extremity, a longitudinally slotted tubular tongue embracing the finger in its slot and adapted when in one position to receive the extremity of the finger in its bore adjacent the inner end of said slot and to engage in said notch, and a pivot carried by the tongue extending transversely of said slot and through a slot in said finger adapted to form a pivotal connection between the tongue and lever as the latter is moved to another position after the tongue has been disengaged from said notch.

GEORGE K. McCANDLESS.

REFERENCES CITED

The following references are of record in the file of this patent:

UNITED STATES PATENTS

| Number | Name | Date |
|---|---|---|
| 659,133 | Church | Oct. 2, 1900 |
| 711,007 | Scott | Oct. 14, 1902 |
| 940,565 | Temple | Nov. 16, 1909 |

FOREIGN PATENTS

| Number | Country | Date |
|---|---|---|
| 1,460 | Great Britain | 1915 |
| 108,073 | Great Britain | July 26, 1917 |